May 15, 1962

H. A. OSTERHOUDT 3,034,777

COILED SPRING REINFORCING CLIP

Filed Nov. 2, 1959

INVENTOR.
HARRY A. OSTERHOUDT
BY
Robert A. Sloman
ATTORNEY

United States Patent Office 3,034,777
Patented May 15, 1962

3,034,777
COILED SPRING REINFORCING CLIP
Harry A. Osterhoudt, Detroit, Mich., assignor to Perfection Automotive Products Corporation, a corporation of Michigan
Filed Nov. 2, 1959, Ser. No. 850,470
1 Claim. (Cl. 267—28)

This application is a continuation-in-part of my copending application Serial No. 824,517, filed July 2, 1959, relating to a coiled spring reinforcing clip.

This invention relates to a spacer or compensator adapted for insertion between adjacent turns of a helical spring.

Heretofore, particularly in vehicle front wheel suspensions and otherwise helical springs after long continued use, become partly fatigued and will sag. This has a bad effect on the level of the vehicle chassis, the location of the headlight beams, as well as on steering of the vehicle. Wheel camber is adversely affected and tire wear is uneven.

An additional difficulty produced by sagging coil springs is that they produce an uncontrollable ride when travelling over irregular surfaces.

It is therefore the primary object of the present invention to provide a resilient spacer which is adapted to be interposed between adjacent turns of a helical spring to compensate for reduced spacing therebetween.

It is a further object to provide a novel spacer of this type, one or more, which may be employed and which itself has an inherent resiliency producing a booster effect upon the sagging spring tending to return the spring to its initial resiliency and predetermined frequency.

It is another object to provide such a spacer which will not become accidently disengaged.

These and other objects will be seen from the following specification and claim in conjunction with the appended drawing in which:

It will be understood that the above drawing illustrates merely a preferred embodiment and that other embodiments are contemplated within the scope of the claim hereafter set forth.

Figure 1:
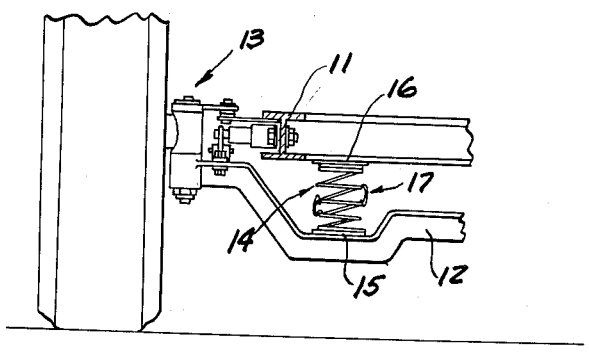
FIG. 1 is a fragmentary front elevational view of the wheel suspension for an automobile showing the present spacers in inserted position.

Referring to the drawing, FIG. 1 is a fragmentary illustration of one important usage of the present spacer in conjunction with the coiled spring mounting for the front wheel suspension of an automobile or other vehicle.

There is fragmentarily shown the conventional chassis 11, being the sprung assembly with the associated unsprung assembly 12, namely the wheel axle or support upon which the conventional wheel assembly is mounted, as at 13.

A conventional type of helical coil spring 14 is interposed in compression between chassis 11 and axle 12, there being suitable cups 15—16 respectively to supportably receive and retain the free ends of the spring.

The present spacer 17 in the desired number and location is inserted between adjacent turns of spring 14 in order to reactivate said spring and to return the spring turns to their normally spaced relation.

The present sag compensator 17 is in the nature of a spring clip being a strip of spring steel which is formed to define the substantially upright body 18.

Figure 3:
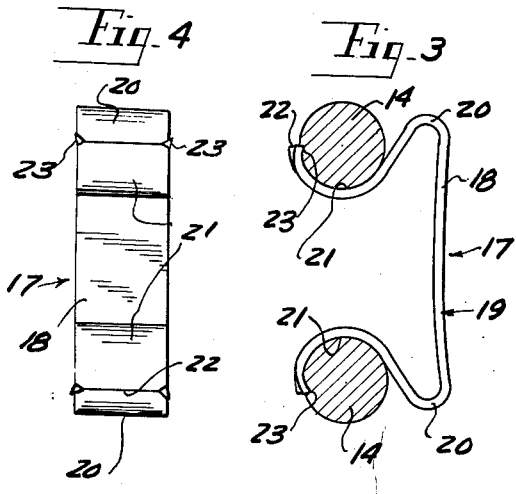
FIG. 3 is a vertical section through the spring of FIG. 2 illustrating the location of the inserted spacer with respect to a pair of adjacent spring turns.
Figure 2:
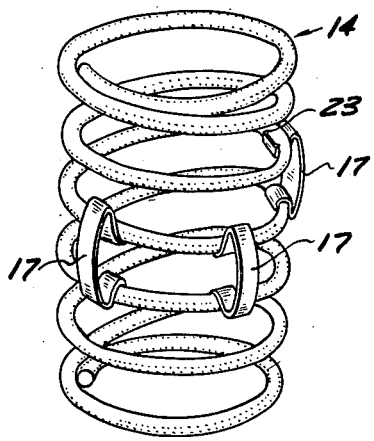
FIG. 2 is a perspective view of an enlarged scale of the coiled spring with spacers inserted.
Figure 5:
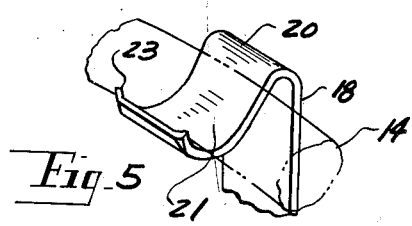
FIG. 5 is a fragmentary perspective view illustrating the securing relation of the spacer with the spring.

The normal form of body 18 is longitudinally concave as at 19 before insertion between adjacent spring turns or before said turns have been released as in FIG. 3, placing the spacer in compression as in FIG. 2.

Normally the clip is inserted by forceful spreading of adjacent spring turns and/or at the same time contracting the ends of clip 18. As shown in FIG. 3, the respective clip bodies 19 have a longitudinally concave form, but in use are longitudinally convex as in FIG. 2.

The present spacer includes at the top and bottom of the spring steel body 18, the opposing U-shaped inwardly directed extensions 20. These terminate in the reverse curved outwardly directed spring turn supports 21 which are substantially semicircular in shape as shown in FIG. 3.

In use, and as shown in FIGS. 1 and 2, supports 21 resiliently and cooperatively engage the opposing surfaces of adjacent turns of helical spring 14. The free ends of supports 21 are substantially flat as at 22 and extend transversely of body 18. The outer corners of said free ends are bent angularly inward at 23 defining the barblike elements shown, adapted for frictional engagement with the turns of the spring to prevent relative movement or slippage.

For this purpose supports 21 have a radius which corresponds substantially to the radius of the spring turns. The inwardly bent elements 23 actually bite into the spring to fixedly locate members 17 against accidental slipping or dislodgement.

The location of the sag compensators or spacers is determined by the user in correcting any spacing of adjacent turns or otherwise sagging or substantially worn coil spring.

A plurality of such spacers may be employed as desired for building up said spring to its initial spacing. These spacers may be reversed and positioned upon the inside of the spring, if desired.

Said spacers are formed of spring steel and are therefore inherently resilient so as to cooperatively engage the said spring turns and build up coiled spring resiliency. Accordingly the present spacers as contrasted with other efforts in this direction go much further than merely regulating the spacing between spring turns. On the other hand, the inherent resiliency of the spacers inserted under compression in effect rebuilds the spring 14 back to its initial strength with the spacer resiliency cooperating with the spring resiliency.

Figure 6:
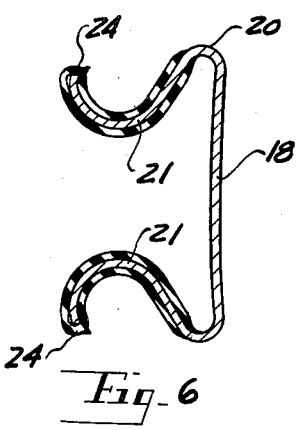
FIG. 6 is a vertical section of the spacer of FIG. 3, but with its free ends coated.
Figure 4:
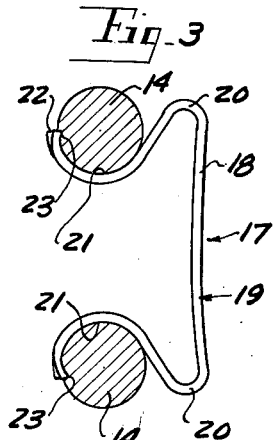
FIG. 4 is an end elevational view of the spacer shown in FIG. 3.

An improved construction is shown in FIG. 6 wherein the spring turn supports 21 have thereover a layer of relatively soft resilient material 24, such as plastic material, or rubber. This covering layer is upon the exterior surfaces of and suitably bonded to spring turn supports 21. For example this may be rubber dipped to thus produce on the supports 21 a yielding or resilient spring turn engaging surface to eliminate noise and to provide a better gripping relation between the clip and the adjacent spring turns.

Having described my invention, reference should now be had to the following claim.

I claim:

In combination, a helical spring and a spacer for inserting between adjacent turns of said spring including a spring steel strip defining an elongated body, opposing U-shaped inwardly directed extensions at the top and bottom thereof upon one side of said body, reverse curved outwardly directed resilient spring turn supports of substantially semi-circular shape, the free ends of said supports extending transversely of said body, the outer corners of said free ends being bent angularly inward for increased frictional engagement with said turns to prevent relative movement and accidental displacement, and a layer of relatively soft resilient material covering the exterior surfaces of and bonded to said spring turn supports, said supports engaging said adjacent spring turns under compression.

References Cited in the file of this patent

UNITED STATES PATENTS

| | | |
|---|---|---|
| 1,714,779 | Harris | May 28, 1929 |
| 2,178,444 | Ware | Oct. 31, 1939 |
| 2,255,543 | Fisher | Sept. 9, 1941 |
| 2,904,329 | Joseph | Sept. 15, 1959 |
| 2,924,447 | Ernest | Feb. 9, 1960 |
| 2,989,345 | Lyon | June 20, 1961 |

FOREIGN PATENTS

| | | |
|---|---|---|
| 758,348 | Great Britain | Oct. 3, 1956 |